United States Patent [19]

Badger et al.

[11] Patent Number: 4,875,695
[45] Date of Patent: Oct. 24, 1989

[54] CHILD SEAT FOR OVER-THE-COUNTER SHOPPING CART

[75] Inventors: Ronald L. Badger, Mt. Laurel, N.J.; Michael Pejakovich, Ceresco, Mich.

[73] Assignee: United Steel & Wire Company, Battle Creek, Mich.

[21] Appl. No.: 204,187

[22] Filed: Jun. 8, 1988

[51] Int. Cl.4 ................................................ B62B 3/08
[52] U.S. Cl. ........................ 280/33.993; 280/33.995
[58] Field of Search ............... 280/33.995, 33.99 F, 280/33.99 H, 33.99 R, 33.993

[56] References Cited

U.S. PATENT DOCUMENTS

| Re. 32,453 | 7/1987 | Stover et al. | 280/33.99 B |
|---|---|---|---|
| 2,919,927 | 1/1960 | Thompson | 280/33.99 B |
| 2,970,845 | 2/1961 | Thompson | 280/33.99 B |
| 3,070,384 | 12/1962 | Buczak | 280/33.99 B |
| 3,184,248 | 5/1965 | Hummer | 280/33.99 B |
| 3,503,622 | 3/1970 | Romero | 280/33.99 F |
| 4,560,180 | 12/1985 | Ulmer | 280/33.99 B |
| 4,682,782 | 7/1987 | Mills | 280/33.99 B |

Primary Examiner—David M. Mitchell
Attorney, Agent, or Firm—Flynn, Thiel, Boutell & Tanis

[57] ABSTRACT

A shopping cart of the over-the-counter type having a baby seat assembly provided with a one-piece back rest unit which includes an upright back rest extending between upright arms associated with a pair of sidewardly-spaced L-shaped supports. These supports have lower generally horizontally extending arms which project rearwardly from the back rest and have the rearward free ends thereof formed with loops for hinged support on a cross rod associated with the rear wall of the basket. The back rest has its lower cross rod spaced upwardly a substantial distance from the bottom wall or seat part of the basket. The back rest can be swung upwardly and rearwardly over the rear wall so as to provide substantial clearance for goods stored on the seat part.

4 Claims, 2 Drawing Sheets

CHILD SEAT FOR OVER-THE-COUNTER SHOPPING CART

FIELD OF THE INVENTION

This invention relates to a shopping cart, and more particularly, to a shopping cart of the over-the-counter type having an improved baby seat assembly associated with the rear thereof.

BACKGROUND OF THE INVENTION

Shopping carts have been utilized for many years by customers in grocery stores, discount stores and the like to permit handling and transporting of merchandise. For a substantial number of years, one widely used form of shopping cart known as an "over-the-counter" cart has its goods-carrying basket supported on a raised frame so that the basket can be positioned directly over the checkout counter to facilitate direct access to the goods by the cashier.

In this conventional over-the-counter shopping cart, the basket is typically constructed of welded wire rod and is provided with a baby seat assembly (typically referred to as a "box baby seat") adjacent the rear thereof. The baby seat assembly normally has the seat part thereof disposed substantially coplanar with the basket bottom. The seat back is typically hingedly joined adjacent its lower edge so that it can be swingably moved from its upright position rearwardly to overlie the seat bottom when in a closed position, thereby opening up the entirety of the basket and baby seat assembly for storage of merchandise. Alternately, some shoppers use the baby seat area as a subcompartment for storage of goods. With this conventional over-the-counter cart, however, the back can not be folded down when goods are stored in the baby seat area. In such instance, the cashier has difficulty reaching the goods stored behind the seat back.

In an attempt to facilitate access to goods stored in the baby seat area when the seat back is in its raised position, one over-the-counter cart has been developed wherein the seat back is hinged forwardly into the basket, rather than rearwardly as has been conventional. This cart is illustrated by U.S. Pat. No. 4,423,882 (now Re No. 32 453). While such arrangement does make it easier for the cashier to gain access to the goods stored behind the upright back of the baby seat assembly, nevertheless this arrangement possesses many of the same disadvantages associated with prior conventional carts, namely disadvantages associated with cost and complexities involved in manufacturing the baby seat assembly particularly due to the associated parts required for latching the seat back in its upright condition.

Another similar shopping cart of the over-the-counter type involving a front-folding baby seat back is illustrated in U.S. Pat. No. 4,560,180. The mounting and latching arrangement in this cart permits the upright back to be selectively folded either forwardly or rearwardly. While this does provide increased flexibility in terms of movement of the seat back for storage purposes, nevertheless the overall arrangement is somewhat costly to manufacture in view of the nature of the structural and functional arrangements involved.

Accordingly, the present invention relates to a baby seat assembly for an over-the-counter shopping cart, and in particular relates to a baby seat arrangement which facilitates access by a cashier to goods stored in the baby seat area, but which can by manufactured and assembled very economically while at the same time providing desirable durability.

In the improved over-the-counter cart of this invention, the seat back of the baby seat assembly is provided with a supporting wall which is spaced upwardly a significant distance from the seat bottom. This supporting wall has opposite edges thereof joined to upright legs of generally L-shaped supports, which upright legs at their lower ends are joined to horizontal legs which extend along the seat bottom and at their rearward ends are hinged adjacent the rear wall of the assembly. The back can be readily hinged upwardly into a storage position wherein the supporting wall projects over the rear wall and generally over the handle of the cart. When swinging into this storage position, the supporting wall is elevated so as to pass over goods stored in the baby seat area to thereby permit access to such goods by the cashier.

Other objects and purposes of the invention will be apparent to persons familiar with carts of this general type upon reading the following specification and inspecting the accompanying drawings.

Figure 1:
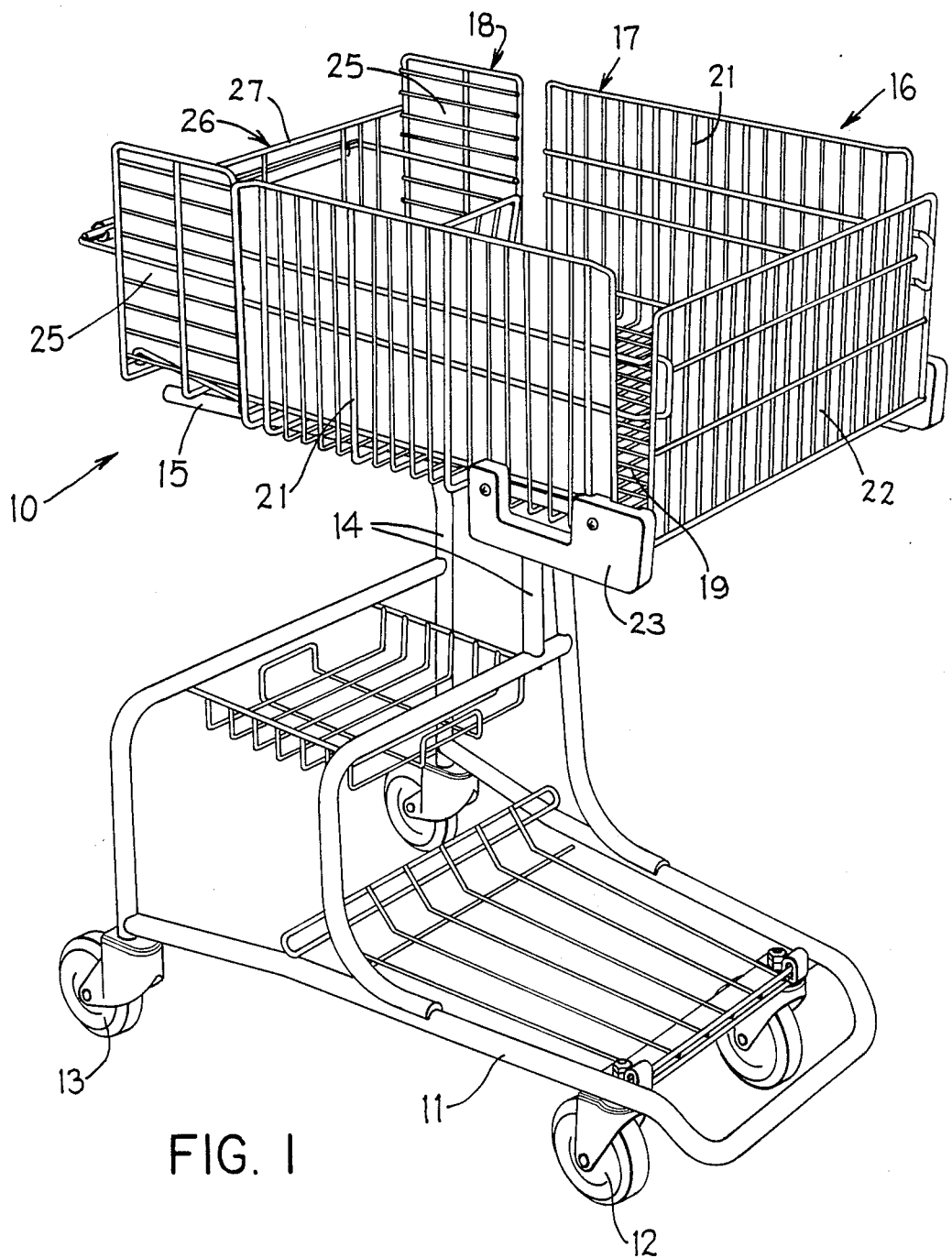
FIG. 1 is a perspective view illustrating a known over-the-counter shopping cart.

In the following description, certain terminology will be used for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the cart, and designated parts thereof. The word "front" will refer to the leading end of the cart (the rightward side in FIG. 1), and the word "rear" will refer to the opposite end, namely the end provided with the handle (this being the leftward side in FIG. 1). Said terminology will include the words specifically mentioned, derivatives thereof, and words of similar import.

DETAILED DESCRIPTION

Referring to the drawings, FIG. 1 illustrates a conventional over-the-counter cart 10 having the improved baby seat assembly of this invention associated therewith.

The cart 10 includes a generally U-shaped tubular base 11 provided with a pair of front casters 12 adjacent the forward end thereof, and a pair of rear wheel 13 adjacent the rear end thereof. The tubular base opens rearwardly to permit nesting of carts in a conventional manner. A support arrangement 14 projects upwardly from the base adjacent the rearward end thereof, which upright arrangement is disposed adjacent one or both sides of the base. This upright arrangement 14 is in turn secured to an elevated frame 15, the latter also conventionally being defined by a rearwardly-opening U-shaped tube disposed approximately in a horizontal plane. This elevated frame 15 in turn has a goods-carrying basket 16 fixedly secured thereto.

The basket 16 is of a generally upwardly-opening boxlike configuration and includes a front basket portion 17 and a box baby seat assembly 18. The front basket portion 17 includes a bottom wall 19 which overlies the elevated frame 15, and opposed generally parallel side walls 21 which project upwardly from opposite sides of the bottom wall 19. The front end of the front basket portion 17 is closed by a front wall 22 which is conventionally formed as an openable gate in that the lower corners of this front wall 22 are hingedly supported, such as on guides 23, so as to permit the gate to be swung outwardly into an open position and then slidably moved horizontally under the bottom wall 19 to facilitate access to the basket.

The box baby seat assembly 18 includes a bottom wall (i.e. a seat portion) 24 which directly over lies and is fixed to the elevated frame 15, whereby this bottom wall 24 in effect constitutes an extension of the front bottom wall 19. Side walls 25 are fixed to and project upwardly from opposite sides of the bottom wall 24. These side walls are generally parallel with but spaced slightly inwardly from the adjacent side walls 21 so that the latter side walls 21 can sidewardly overlap the side walls 25 when the front basket portion 17 is hinged upwardly about its rear edge into an upright position for nesting purposes.

Figure 2:
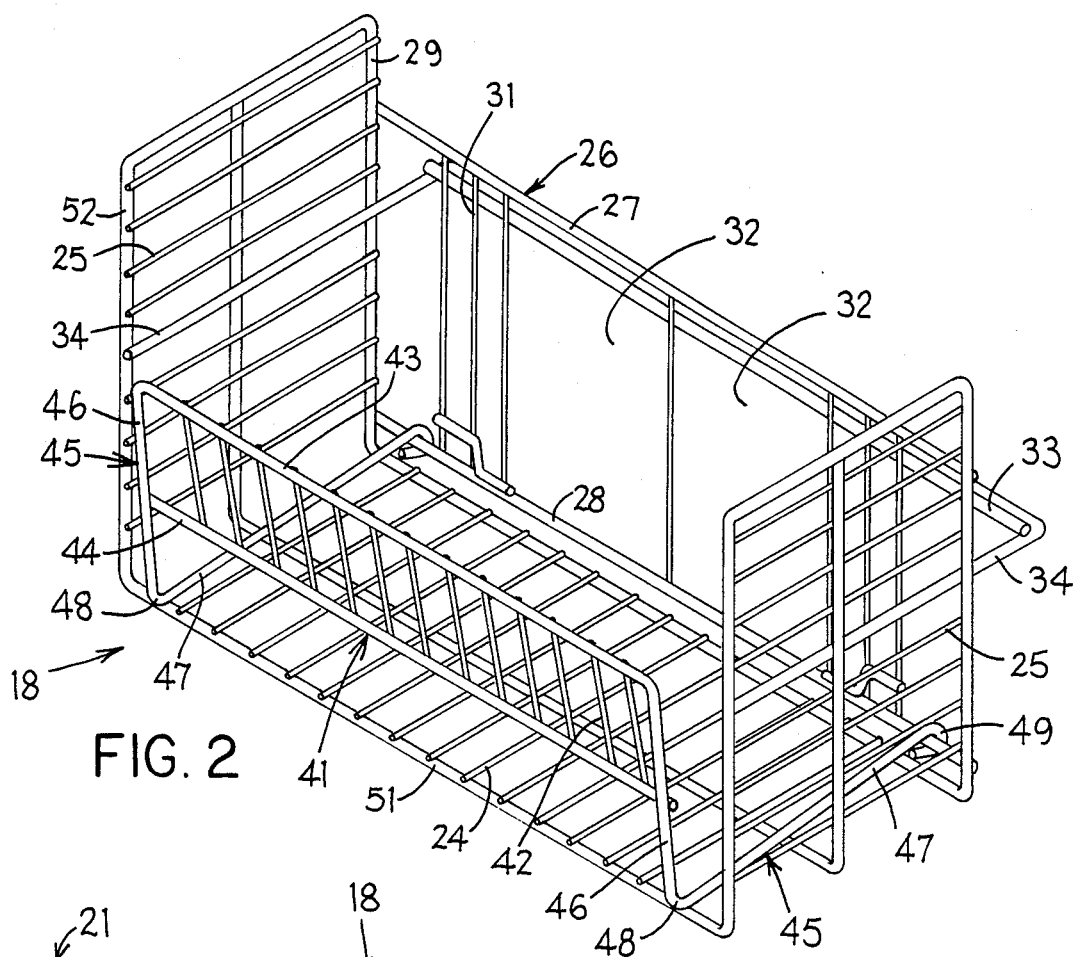
FIG. 2 is an enlarged perspective view illustrating solely the improved baby seat assembly of this invention.

The rear of the baby seat assembly is closed by a rear wall 26 which is fixedly joined to and extends perpendicularly between the rear edges of the side walls 25. This rear wall 26, as illustrated by FIG. 2, is defined by top and bottom rods 27 and 28, respectively, which extend generally horizontally and are joined to the rear upright rods 29 associated with the side walls 25, such as by being welded thereto. These horizontal rods 27 and 28 in turn are joined together by several intermediate wire elements 31 which extend generally vertically. As is conventional, the vertical elements 31 are appropriately spaced so as to define a pair of leg openings 32.

The basket 16 also has a handle 33 fixed thereto, which handle extends horizontally across the basket in rearwardly spaced relationship from the rear wall 26. The handle is at an elevation slightly below the upper rod 27. Handle 33, at opposite ends thereof, has inwardly projecting supports 34 which are fixedly, such as weldably, joined to the side walls 25.

As illustrated, all of the basket walls are preferably formed from wire rods, with first and second parallel sets of such rods being disposed in perpendicular and intersecting relationship, with the rods being suitably formed and welded together to define the various walls.

The overall structure of the cart 10, as described above, is conventional and well known so that further detailed description thereof is believed unnecessary.

Figure 3:
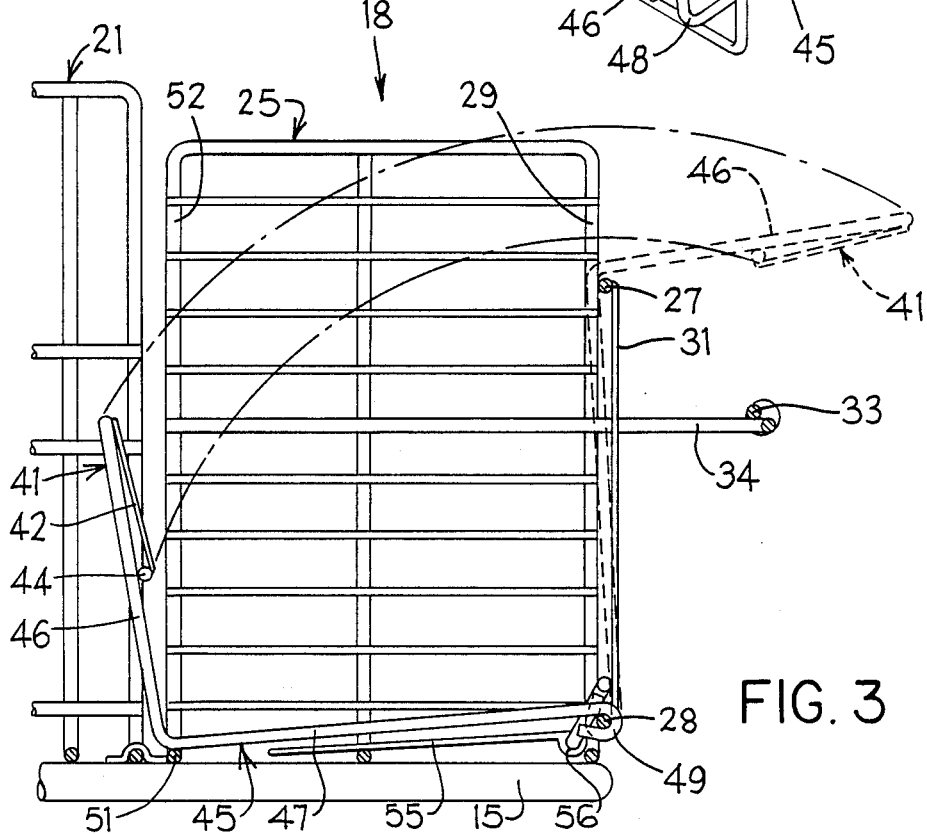
FIG. 3 is a fragmentary side elevational view illustrating the rear of the cart, and specifically the baby seat arrangement, the latter being shown in solid lines in its upright use position, and in dotted lines in its storage position.

According to the present invention, and referring to FIGS. 2 and 3, the improved baby seat assembly 18 is designed so as to be economical to manufacture and assemble, and at the same time increase accessability to goods or merchandise which are stored therein when the baby seat assembly is in its upright or use position.

FIG. 2 illustrates the baby seat assembly 18 in its upright or "use" position.

The baby seat assembly 18 includes a support wall or back rest 41 which is of a generally planar configuration so as to permit a child to rest thereagainst. This back rest 41 extends generally across substantially the full width of the basket and is defined by a plurality of generally upright or vertical wires or rods 42 which are fixedly joined (as by being welded) to upper and lower horizontally-extending cross rods 43 and 44, respectively. The lower cross rod 44, when the back rest is in the upright position illustrated by FIGS. 2 and 3, is spaced upwardly a substantial distance above the bottom wall 24, the latter functioning as a seat for a child. Bottom rod 44 is normally spaced upwardly from the bottom wall 24 by a distance in the range of between about 3 inches and about 5 inches. The vertical region between the bottom wall 24 and this lower cross rod 44 is totally open.

The back rest 41 is hingedly supported by a pair of generally L-shaped support arms 45 which are secured adjacent the opposite side edges of the back rest 41. Each of these L-shaped support arms 45, when the box baby seat is in the "use" position, includes a generally vertically extending arm 46 which is secured to the ends of the cross rods 43–44 and which projects downwardly therefrom and is joined to a rearwardly extending arm 47 through an intermediate bend 48, the latter being substantially a 90° bend. The rearwardly projecting arm 47, at its free end, is provided with a loop 49 thereon which encircles the lower cross rod 28 associated with the rear wall 26. The cross rod 28 hence functions as a hinge for enabling the back rest 41 to be swingably moved between the use position illustrated by solid lines in FIGS. 2 and 3, and the storage position indicated by dotted lines in FIG. 3.

The cross rod 28 is normally spaced upwardly a small distance above the bottom wall 24 so that the hinge axis is hence spaced upwardly a small distance above the seat of the baby seat assembly. The legs 47 of the supports 45 project forwardly from the hinge in close proximity to the side walls 25 so as to not interfere with the child or goods disposed on the seat 24. The L-shaped supports 45, in the vicinity of the bends 48, bear on a cross rod 51 which defines the front edge of the seat 24, which cross rod 51 in turn is integral with upright rod elements 52 which define the front vertical edge of the side walls 18. Due to the position of the hinge for the seat back as defined by cross rod 28, and the fact that the bends 48 rest directly on the cross rod 51, this hence results in the back of the baby seat assembly being slightly inclined toward the front of the cart as it projects upwardly (as shown in FIG. 3) to facilitate the comfort of a child occupying the baby seat assembly. This incline is further emphasized by the fact that the L-shaped side supports 45 and the top cross rod 43 are all preferably formed from a single U-shaped rod member, whereas the lower cross rod 44 is welded to the front side of arms 46, and the vertical wires 42 are in turn welded to the front side of the cross rod 44 so as to still further increase the incline of the back rest as illustrated by FIG. 3.

As is conventional, a plastic plate-like leg hole cover 55 is associated with the baby seat assembly. This leg hole cover 55 is adapted to overlie the seat 24 but, due to its hinged connection at 56, can be swung upwardly so as to effectively close off the leg holes 32 to permit storage of merchandise with the subcompartment defined by the baby seat assembly when the latter is in its "use" position. The leg hole cover 55 has been eliminated from FIG. 2 for convenience in illustration.

In use, the baby seat assembly is normally positioned substantially as illustrated by solid lines in FIGS. 2 and 3. In this position, it can hence be used in a conventional manner so as to permit a child to be seated on the seat 24, with the child's legs projecting out through the leg holes 32, whereupon the child then leans back against the back rest 41. However, many users prefer to maintain the baby seat assembly in the use position, but utilize it as an auxiliary compartment for storage of delicate goods such as eggs or bread. In such situation, the merchandise is deposited directly on the seat or bottom wall 24 and is isolated from the front basket compartment by the back rest 41. However, since the lower cross rod 44 is spaced upwardly a substantial distance from the bottom wall 24, this still provides open communication between the baby seat compartment and the front basket compartments in that goods of greater size or length can readily pass from one compartment to the other. Further, when the cart is moved into the checkout area, the cashier can normally readily access the goods stored in the baby seat compartment. For example, if eggs or a loaf of bread or other related small merchandise is stored in the baby seat area, the goods are normally supported on the bottom wall 24 between the side arms 47. The cashier can readily grasp the back rest 41 and swing it into the storage position. During this swinging movement, the back rest 41 moves through the area indicated by dash-dot lines (FIG. 3) until reaching the dotted line position wherein it projects rearwardly over the top rod 27 of the rear wall so as to be disposed over the handle 33. Due to the positioning of the hinge and the configuration of the back rest, all of the region disposed below the lowermost dash-dot line does not interfere with the swinging of the back rest into its storage position, and hence goods can readily remain in this area during the swinging step. After the back rest is swung into its storage position, the rear basket compartment hence is fully open into the front basket compartment so that the cashier has full access to the merchandise therein.

The baby seat assembly 18 of this invention is desirable inasmuch as the complete back rest assembly is defined substantially as a single unitary structure. That is, the back rest 41 and the L-shaped side supports 45 are all rigidly joined together to define a single weldment, and in fact the side supports 45 and the top cross rod 43 are preferably defined from a single U-shaped wire rod. Further, the rearward ends of the side support legs 47 themselves have a simple loop formed therein to function as a hinge, whereby the complete back rest assembly can hence by easily and inexpensively fabricated and assembled. Once installed on the cart, the baby seat is simple in operation, durable, and wholly free of latching elements and related structural accessories.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an over-the-counter shopping cart having a wheel-supported base, an elevated frame positioned upwardly a substantial distance above said base and rigidly joined thereto by an upright structure which joins to said base adjacent the rearward end thereof, an upwardly-opening basket mounted on said elevated frame, said basket having a rear baby seat assembly which includes a bottom wall fixed to said elevated frame and a pair of generally upright side walls projecting upwardly from opposite sides of said bottom wall and a rear wall which projects upwardly from said bottom wall and is rigidly joined between said side walls, said rear wall having a pair of sidewardly-spaced leg-hole openings extending therethrough, said rear wall having a top rod member extending therealong and defining the upper edge thereof, said rear wall also having a lower rod member extending generally parallel with said top rod member and being disposed below said leg openings, the improvement comprising a one-piece unitary back rest arrangement associated with the baby seat assembly, said unitary back rest arrangement being swingably moveable between (1) in use position wherein it functions as a back rest and projects upwardly from the bottom wall in forwardly spaced relationship from said rear wall and (2) a storage position wherein it projects rearwardly over the top of said rear wall, said unitary back rest arrangement including a back rest wall which extends generally transversely between said side walls and has opposite ends thereof rigidly joined to a pair of generally parallel L-shaped support arms which are sidewardly spaced apart and disposed closely adjacent the respective side walls, each said L-shaped support arm including a first cantilevered leg which adjacent its free end is pivotally supported on said lower rod member, said first leg adjacent its forward end being rigidly joined to a second leg which extends approximately perpendicularly with respect to said first leg, said back rest wall being rigidly joined between said second legs and including upper and lower support rods which extend generally parallel with one another and have opposite ends thereof rigidly joined to said second legs, said lower support rod being spaced upwardly a substantial distance from the point of intersection of said first and second legs so as to be spaced upwardly a substantial distance above the bottom wall when the unitary back rest arrangement is in said use position, said support arms bearing directly against said bottom wall when the unitary back rest arrangement is in said use position so that the back rest wall projects upwardly relative to said bottom wall, said first legs defining a unitary opening which extends transversely therebetween and into and through which objects supported on said bottom wall of said baby basket assembly pass as said unitary back rest arrangement is moved between said use and storage positions, said unitary opening extending substantially from said free ends of said first legs to said forward ends thereof.

2. A cart according to claim 1, wherein said L-shaped arms and the upper support rod of said back rest wall are integrally formed from a single rod having a substantially U-shaped configuration, said first and second legs of each said L-shaped support arm being integrally joined together through a substantially 90-degree bend, and the lower support rod of said back rest wall being rigidly joined to said second legs at a location disposed substantially midway between said bends and said upper support rod.

3. In an over-the-counter shopping cart having a wheel-supported base, an elevated frame positioned upwardly a substantial distance above said base and rigidly joined thereto by an upright structure which joins to said base adjacent the rearward end thereof, an upwardly-opening basket mounted on said elevated frame, said basket having a rear baby seat assembly which includes a bottom wall fixed to said elevated frame and a pair of generally upright side walls projecting upwardly from opposite sides of said bottom wall and a rear wall which projects upwardly from said bottom wall and is rigidly joined between said side walls, said rear wall having a pair of sidewardly-spaced leg-hole openings extending therethrough, said rear wall having a top rod member extending therealong and defining the upper edge thereof, said rear wall also having a lower rod member extending generally parallel with said top rod member and being disposed below said leg openings, the improvement comprising a one-piece unitary back rest arrangement associated with the baby seat assembly, said unitary back rest arrangement being swingably moveable between (1) a use position wherein it functions as a back rest and projects upwardly from the bottom wall in forwardly spaced relationship from said rear wall and (2) a storage position wherein it projects rearwardly over the top of said rear wall, said unitary back rest arrangement including a back rest wall which extends generally transversely between said side walls and has opposite ends thereof rigidly joined to a pair of generally parallel L-spaced support arms which are sidewardly spaced apart and disposed closely adjacent the respective side walls, each said L-shaped support arm including a first leg which adjacent its free end is pivotally supported on said lower rod member, said first leg adjacent its forward end being rigidly joined to a second leg which extends approximately perpendicularly with respect to said first leg, said back rest wall being rigidly joined between said second legs and including upper and lower support rods which extend generally parallel with one another and have opposite ends thereof rigidly joined to said second legs, said lower support rod being spaced upwardly a substantial distance from the point of intersection of said first and second legs so as to be spaced upwardly a substantial distance above the bottom wall when the unitary back rest arrangement is in said use position, said support arms bearing directly against said bottom wall when the unitary back rest arrangement is in said use position so that the back rest wall projects upwardly relative to said bottom wall, said L-shaped arms and the upper support rod of said back rest wall being integrally formed from a single rod having a substantially U-shaped configuration, said first and second legs of each said L-shaped support arm being integrally joined together through a substantially 90-degree bend, the lower support rod of said back rest wall being rigidly joined to said second legs at a location disposed substantially midway between said bends and said upper support rod, and said lower rod member of said rear wall being disposed at an elevation which is spaced upwardly a small distance above said bottom wall so that said first legs extend at a small incline relative to said bottom wall when said back rest arrangement is in said use position.

4. A cart according to claim 3, wherein the lower support rod of said back rest wall is spaced upwardly above said bottom wall by a distance in the range of about 3 inches to about 5 inches when said back rest arrangement is in said use position, the region under said lower support rod being totally open.

* * * * *